Dec. 13, 1960
L. J. MAASDAM
2,964,247
IRRIGATION APPARATUS
Filed July 14, 1958
3 Sheets-Sheet 1
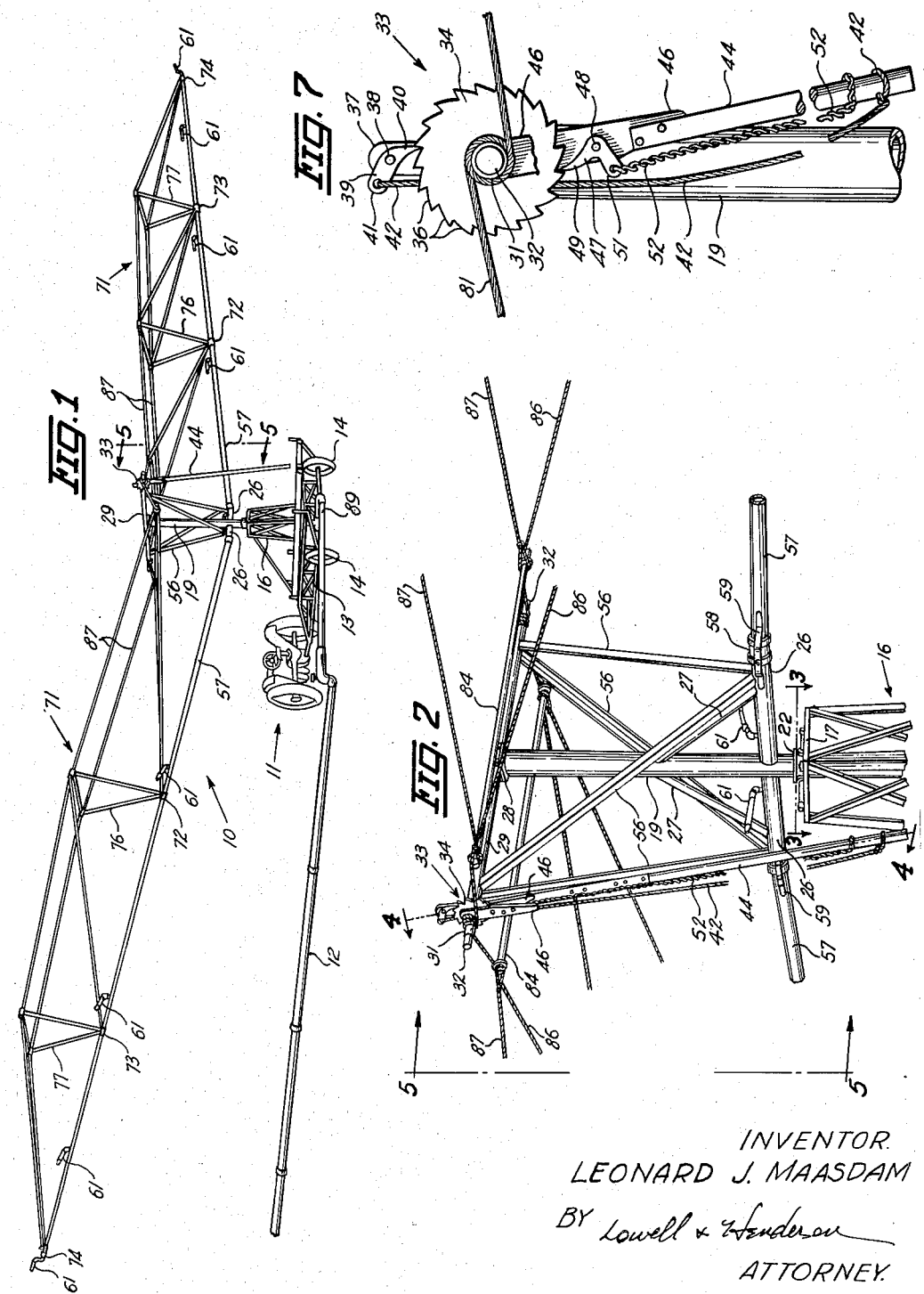
INVENTOR.
LEONARD J. MAASDAM
BY Lowell & Henderson
ATTORNEY.

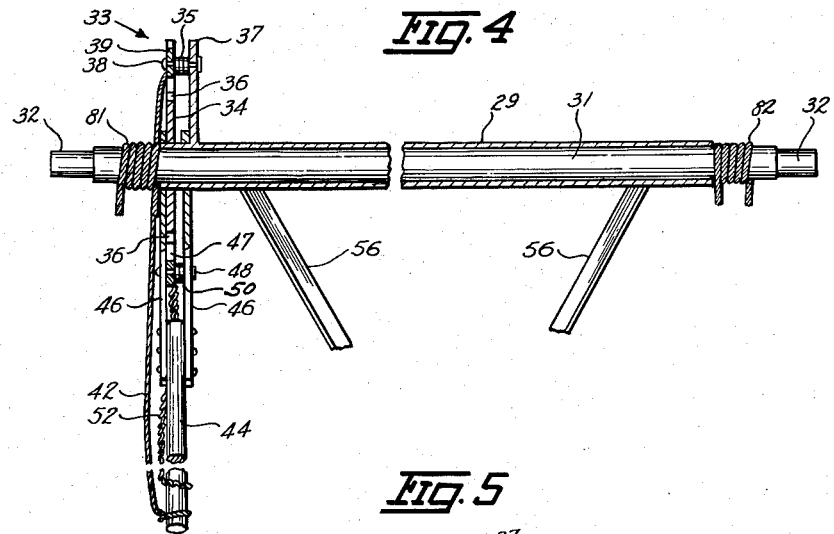
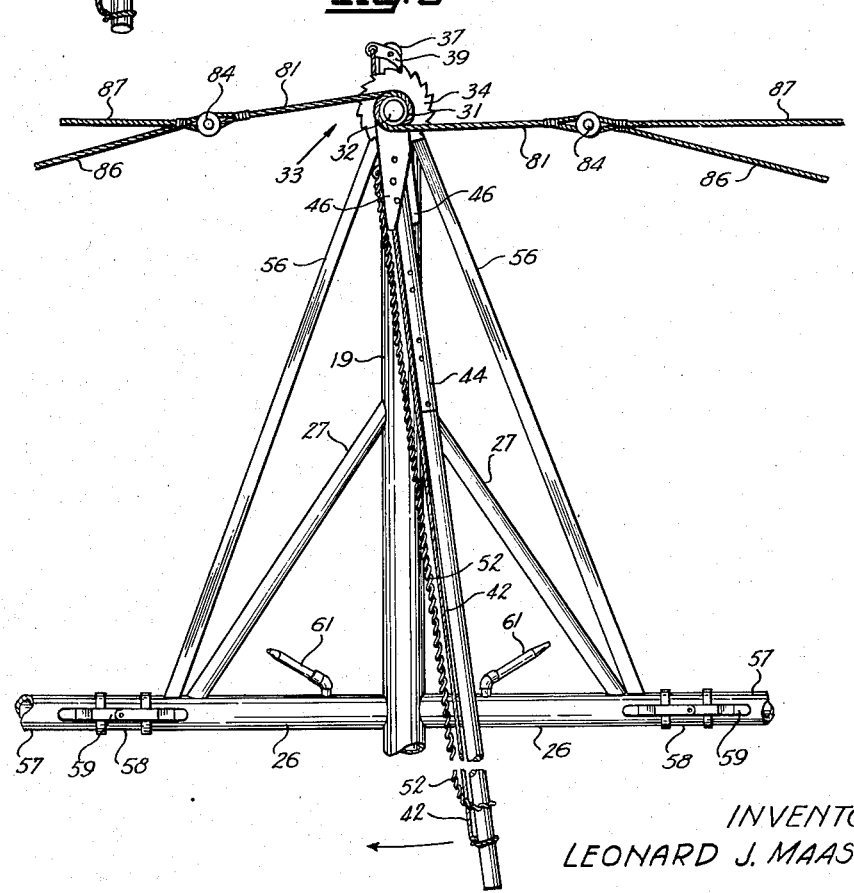

Dec. 13, 1960   L. J. MAASDAM   2,964,247
IRRIGATION APPARATUS
Filed July 14, 1958   3 Sheets-Sheet 3
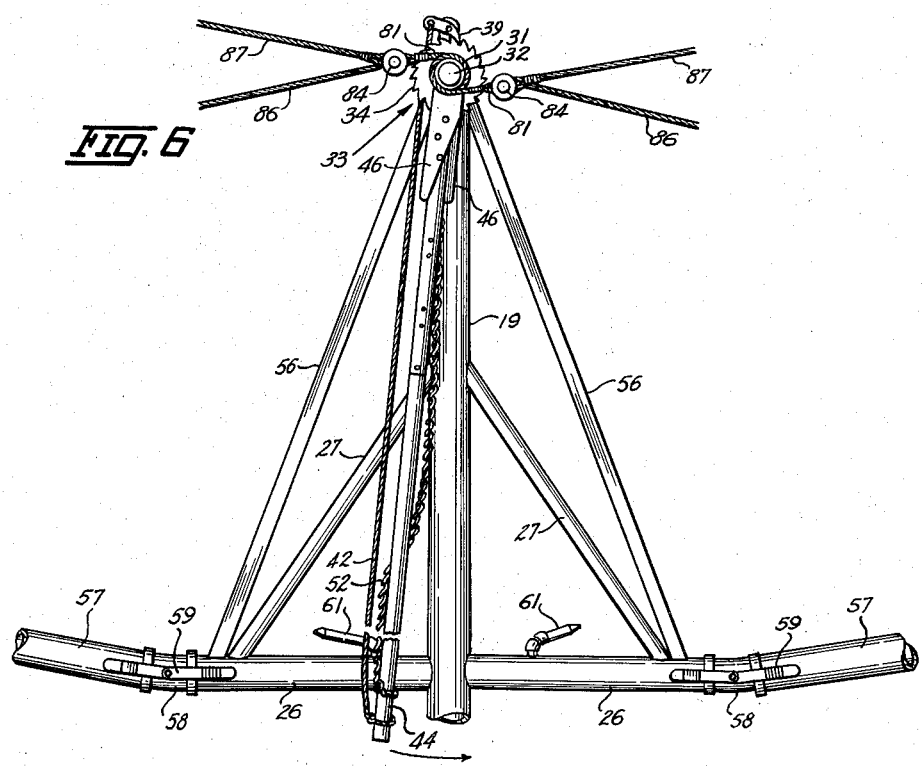
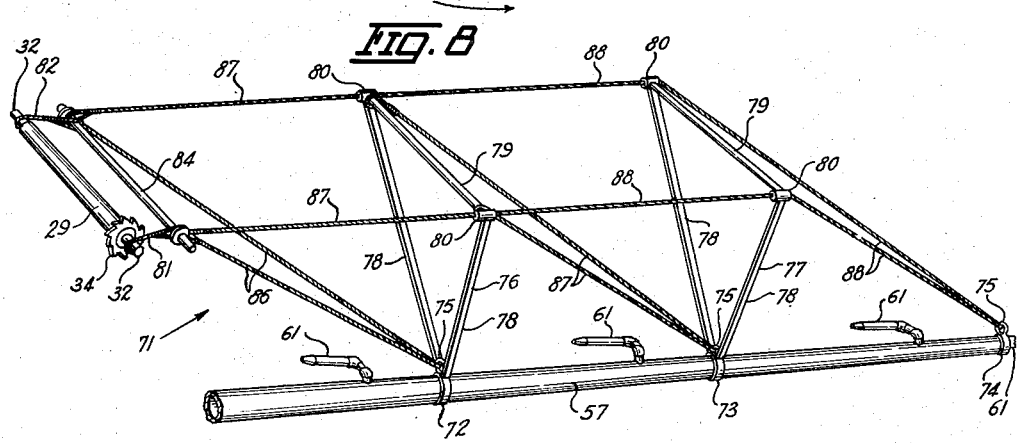
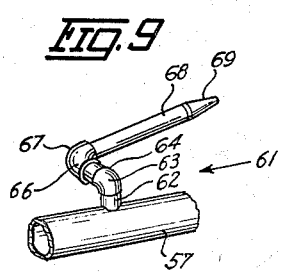
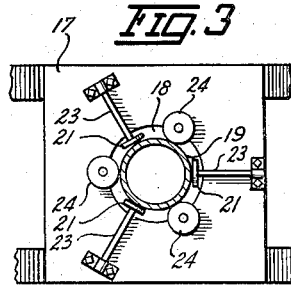
INVENTOR.
LEONARD J. MAASDAM
BY Lowell + Henderson
ATTORNEY.

United States Patent Office 2,964,247
Patented Dec. 13, 1960

2,964,247

IRRIGATION APPARATUS

Leonard John Maasdam, Sully, Iowa, assignor to Pella Irrigation Co., Pella, Iowa, a partnership Filed July 14, 1958, Ser. No. 748,297

1 Claim. (Cl. 239—251)

This invention relates generally to field irrigation apparatus and more particularly to a portable sprinkler device.

An object of this invention is to provide an improved sprinkler device.

A further object of this invention is to provide a portable sprinkler device which includes rotatable booms having discharge nozzles for distributing water over a circular area during rotation of the booms.

Another object of this invention is to provide a portable sprinkler device having a pair of rotatable booms and fluid discharge members arranged on the booms so as to rotate the booms on discharge of fluid.

A further object of this invention is to provide a portable sprinkler device having a pair of horizontally rotatable and vertically movable booms provided with fluid discharge members thereon, and including further means for raising and lowering said booms.

Another object of this invention is to provide a portable sprinkler device which is simple in construction, economical to manufacture, and efficient in irrigating a field.

Further objects, features and advantages of this invention will become apparent from a consideration of the following description when taken in connection with the accompanying drawing in which:

Fig. 1 is a perspective view of the portable sprinkler device of this invention, shown in assembly relation with a towing tractor and a water delivery line;

Fig. 2 is an enlarged fragmentary view of a portion of the device shown in Fig. 1;

Fig. 3 is an enlarged horizontal sectional view taken along the line 3—3 of Fig. 2;

Fig. 4 is an enlarged vertical sectional view taken along the line 4—4 of Fig. 2;

Fig. 5 is an enlarged, fragmentary side elevational view of a portion of the device, taken at an angle substantially normal to the longitudinal axis of the boom members, with some parts broken away for the purpose of clarity;

Fig. 6 is a view similar to Fig. 5 wherein some of the parts are shown in alternate positions relative to their showing in Fig. 5;

Fig. 7 is an enlarged, fragmentary elevational view of the pawl and ratchet arrangement, with some parts broken away for the purpose of clarity;

Fig. 8 is an enlarged, fragmentary foreshortened perspective view of the rigging arrangement for lifting a boom; and Fig. 9 is an enlarged fragmentary perspective view of a portion of a boom member and a fluid discharge member therefor in the device of this invention.

With reference to the drawings, the sprinkler device of this invention, indicated generally at 10, is illustrated in Fig. 1 in assembly relation with a towing tractor 11 and a water line 12 connected to a pump (not shown) having a suitable source of water supply. The device 10 includes a frame 13 provided with ground wheels 14 and having an upwardly extended scaffold or tower 16.

As best appears in Fig. 3, the tower 16 is provided at its upper end with a flat plate 17 which is provided with a central opening 18 through which a portion of an upright tubular standard 19 is extended. Arranged within the opening 18 (Fig. 3), at evenly spaced positions about the standard 19, are three upright rollers or discs 21 arranged in supporting engagement with the underside of a radially extended flange 22 (Fig. 2) on the standard 19. The discs 21 are rotatably supported on short shafts 23 carried by the plate 17.

Arranged in an alternating relation with the discs 21, are three similar rollers or discs 24 supported in horizontal positions on the plate 17 and in rolling engagement with the standard 19. Although not shown herein, the standard 19 is further supported in a comparable manner at its base so that the standard 19 is movable about its upright axis in a horizontal manner.

Connected to and extended outwardly in opposite directions from the standard 19 at a position directly above the plate 17 are a pair of tubular members 26 the interiors of which register with the interior of the standard 19. A pair of brace members 27 are connected to and extended between a respective member 26 and a portion of the standard 19 for support thereof. Pivotally connected to each tubular member 26 is a tubular boom member 57 (Fig. 5). The connection is by a fluid transmitting joint device 58, and by a pivot unit 59 arranged in such a manner that each boom member 57 is adapted to pivot in a vertical plane.

Each boom member 57 carries a plurality of longitudinally spaced fluid discharge units 61 (Fig. 9), each of which includes an upright connector 62 connected to and extended upwardly from a boom member 57. An elbow 63 mounted on a connector 62 has a transversely extended leg 64 which is connected to a similar leg 66 by a second elbow 67 that carries an elongated tube 68. Mounted on the terminal end of a tube 68 is a nozzle 69. By virtue of the provision of the two elbows 63 and 67, the tube 68 can be raised to change the vertical inclination thereof by rotation of the elbow 67 relative to the elbow 63. Likewise, by rotating the elbow 63 relative to the connector 62, the horizontal inclination of the tube 68 relative to the boom member 57 may be adjusted.

Secured to the top of the standard 19 is a plate member 28 (Fig. 2) on which a tubular element 29 is securely mounted. The element 29 is horizontally disposed and extends in a direction substantially normal to the direction of the tubular members 26. Two pairs of supporting braces 56 (Fig. 2) are connected for support between the element 29 and the tubular members 26. A shaft 31 (Fig. 4) is inserted through the element 29 and is rotatable therein. The opposite ends 32 of the shaft 31 extend outwardly beyond each end of the element 29.

Mounted adjacent one end 32 of the shaft 31 is a winch unit 33 (Figs. 4 and 7). The unit 33 includes a ratchet wheel 34 having serrated teeth 36 which is secured to the one end 32 of the shaft 31 whereby rotation of the wheel 34 causes like rotation of the shaft. An upright stand 37, secured to the element 29 adjacent the inner side of the wheel 34, includes a pivot element 38 on which a holding pawl 39 (Fig. 7) is mounted. The pawl 39 has a holding end 40 adapted to engage the teeth 36 of the wheel 34, and includes an opposite end 41 to which a pull cord 42 is connected. A spring 35 is secured about the pivot 38 and is connected to the pawl 39 in a conventional manner so as to bias the pawl 39 in a clockwise manner, as viewed in Fig. 7, into engagement with the ratchet teeth 36.

For manual operation of the unit 33, there is provided an elongated lever arm 44 having a pair of yoke members 46 secured to its upper end (Fig. 4) and rotatably mounted on the tubular element 29 so as to straddle the ratchet wheel 34. A working pawl 47 is rotatably supported on a pivot element 48 that is carried between the yoke members 46, and includes a working end 49 adapted to engage the serrated teeth 36 of the ratchet wheel 34. The opposite end 51 of the pawl 47 is connected to a pull chain 52. A spring 50 is mounted on the pivot element 48 and connected to the working pawl 47 in a conventional manner so as to bias the working pawl 47 in a clockwise manner, as viewed in Fig. 7 into engagement with the ratchet teeth 36. The pull cord 42 and the pull chain 52 are separately looped about the lower part of the lever 44 for ease of manipulation in moving their respective pawls 39 and 37.

For the purpose of raising or lowering a tubular boom member 57 in response to operation of the winch unit 33, a lifting unit 71 (Fig. 8) is provided. The unit 71 includes a trio of securing devices 72, 73, and 74 which are spaced longitudinally along the boom member 57, with the securing device 74 being at the outer end thereof. Each securing device includes a hook member 75. The unit 71 includes further a pair of triangularly shaped inner and outer rigging pieces, 76 and 77 respectively, each of which includes of pair of side arms 78 joined at their spaced upper ends by a top arm 79. Of note, the top arm 79 of each rigging piece is disposed in a horizontal manner and lies substantially parallel to the tubular element 29. A spool 80 is secured to each end of each top arm 79, whereby a bore (not shown) formed through each spool extends parallel to the axis of a boom member 57.

Referring now to Figs. 4 and 5, a pair of ropes 81 and 82 are each looped about a respective end 32 of the shaft 31, whereby the opposite ends of each rope extend in opposite directions. The common ends of the ropes 81 and 82 are joined in spaced relation to the opposite ends of a spacer bar 84 (Fig. 2) of a length approximating that of the shaft 31 and the rigging top arms 79. It may thus be seen that by rotating the ratchet wheel 34 in a manner hereinafter described so that the shaft 31 also rotates, the spacer bars 84 will either be moved toward each other or away from each other as the case may be. In either event, the rate of movement will be the same as will be the distance moved.

Referring to Fig. 8, a first pair of cables 86 extend from the opposite ends of the spacer bar 84 downwardly to the hook member 75 of the securing device 72 closest to the standard 19. A second pair of cables 87 also extend from the opposite ends of the spacer bar 84 in a horizontal manner through the spools 80 mounted at the ends of the top arm 79 of the inner rigging piece 76, and then downwardly to the hook member 75 of the securing device 73 at the base of the outer rigging piece 77. A third pair of cables 88 are mounted in a manner similar to the second pair of cables 87, wherein the cables 88 extend from opposite ends of the top arm 79 of the inner rigging piece 76 through the spools 80 mounted on the outer rigging piece 77 and then downwardly to the hook member 75 of the securing device 74 mounted at the outer end of the tubular boom member 57. By this arrangement, it may be seen that upon operation of the unit 33 to pull the spacer bars 84 toward the shaft 31 and each other, an equal pull is exerted on each of the hook members 75 in a direction parallel to the longitudinal axis of each boom 57. Thus, irrespective of the position of a boom member 57, the cables 86, 87, and 88 are continually taut for effective utilization. Additionally, this type of rigging arrangement obviates the possibility of the boom members bending during their raising or lowering movements.

In use, assume that the water line 12 is connected to a pump (not shown) for pumping water under pressure from a lake, river or the like through the line 12 toward the device 10. The end 89 (Fig. 1) of the line 12 is connected to the lower end of the standard 19 in such a manner that irrespective of the rotated position of the standard, fluid under pressure is supplied through the standard 19 and out the tubular members 26 to the two boom members 57.

By facing the nozzles 69 of the fluid discharge units 61 on one boom 57 in an opposite direction from those on the other boom 57, and wherein the nozzles 69 are horizontally inclined, the discharge of fluid therethrough will rotate the booms 57 and in turn the standard 19 about a vertical axis. This action is due to the fluid issuing from each nozzle 69 exerting a force in the opposite direction on the boom 57. Putting it another way, the nozzle units 61 for each boom are arranged on opposite sides so that water issuing from the units exerts substantially complementary forces on the booms 57. Additionally, the speed of rotation of the booms may be varied merely by varying the inclination of the nozzles 69 relative to the boom 57.

It may thus be seen that by the provision for self-propelling the booms about the axis of the standard 19, and by providing the discharge units 61, a circular area of a diameter considerably greater than the combined lengths of the booms 57 is completely sprinkled with water.

For the purpose of varying the area irrigated at one position of the device 10, the booms 57 may be raised and lowered so as to vary their effective horizontal lengths. This is accomplished by operation of the lever arm 44 to actuate the winch unit 33. Assuming that the booms 57 are in a horizontal position when the unit 33 is in the position indicated by Fig. 5, it is noted that the ropes 81 and 82 are considerably unwound from the shaft 31.

To rewind the ropes 81 and 82, whereby the spacer bars 84 will be moved toward the shaft 31 to a position best indicated in Fig. 6, the lever arm 44 is pulled by an operator in a clockwise manner as indicated by the arrow in Fig. 5. By this movement, the end 49 of the working pawl 47 normally engaged with the teeth 36 of the ratchet wheel 34, rotates the wheel and thus the shaft 31 in a clockwise manner (Fig. 5). Such rotation causes the ropes 81 and 82 to be wound about the shaft. As the pull exerted by the spacer bars 84 is transmitted through the lifting units 71 to each of the boom members 57, the booms are caused to pivot upwardly about their respective pivot unit 59.

At the end of the swing of the lever arm 44 as determined by the operator, the lever arm 44 may be swung counterclockwise (Fig. 6) to a position where another clockwise (Fig. 5) operative movement of the lever arm 44 may be made if desired. During the counterclockwise movement of the lever arm 44, the working pawl 47 merely rides along the teeth 36 in an oscillatory manner. The holding pawl prevents the wheel 34 from rotating under the weight of the booms 57. The amount of raising is limited by the ropes 81 and 82 being completely wound until the spacer bars 84 almost contact the shaft 31, and the lowering is limited by a complete unwinding of the ropes.

To lower the booms 57 in a gradual manner, assuming the lever arm 44 is in the position shown in Fig. 6, the pull cord 42 is pulled so as to pivot the holding pawl end 40 out of engagement with the ratchet wheel teeth 36. By freeing the winch ratchet wheel 34 from any holding restrain thereon, the weight of the booms 57 tends to whip the winch unit 33 and the lever arm 44 in a counterclockwise manner. Such movement then of the lever arm is restrained by the operator so as to permit only a gradual movement. As the working pawl 47 remains engaged with the wheel 34, the weight of the booms 57 will also cause the wheel 34 to follow the pawl 47 and thus rotate in a counterclockwise manner (Fig. 6). This permits the ropes 81 and 82 to play out and the booms 57 to lower.

Should further lowering be desired, a release of the pull cord 42 will permit the biasing spring 43 to rotate the holding pawl 39 into engagement with the wheel 34. This holds the wheel in place during a clockwise movement (Fig. 5) of the lever arm 44 to the original position for lowering. During such clockwise movement, the pull chain 52 is pulled so as to move the working pawl 47 out of engagement with the teeth 36 of the ratchet wheel 34. The above lowering operation is then repeated.

In summation, an improved portable sprinkler device is disclosed wherein a pair of sprinkler boom members, mounted on a portable framework are adapted for a self-propelled rotary movement upon the supply of water thereto, and are pivotally movable in a vertical manner to a variety of vertically adjusted positions.

Although the invention has been described with respect to a preferred embodiment thereof, it is to be understood that it is not to be so limited since changes can be made therein which are within the scope of the appended claim.

I claim:

Field irrigation apparatus comprising portable means adapted for overland movement, standard means rotatably mounted on said portable means for horizontal movement, fluid sprinkling means including a tubular boom member pivotally attached to said standard means for vertical movement, which means mounted on said standard means and including a horizontally disposed, rotatable shaft, at least a pair of rigging devices secured to and longitudinally spaced on said boom member, each rigging device including a horizontally disposed rod member having spool devices mounted on opposite ends thereof and spaced vertically over said boom member, and cable means for lifting said boom member including a first pair of cables extended from opposite sides of said shaft to the base of the rigging device closest to said standard means, a second pair of cables extended from opposite sides of said shaft to the base of the rigging device farthest from said standard means and trained therebetween through the spool devices of said closest device, and a third pair of cables extended from opposite sides of the rod member of the closest device to the end of said boom member and trained therebetween through the spool devices of said farthest device.

References Cited in the file of this patent

UNITED STATES PATENTS

| | | |
|---|---|---|
| 1,068,797 | Mathers | July 29, 1913 |
| 1,299,380 | Plumer | Apr. 1, 1919 |
| 2,787,499 | Ralston | Apr. 2, 1957 |